G. W. TAYLOR & J. P. MULLER.
TOOL FOR SECURING THE COVERS IN PAINT TINS AND THE LIKE.
APPLICATION FILED MAR. 18, 1907.

909,254.

Patented Jan. 12, 1909.

2 SHEETS—SHEET 1.

G. W. TAYLOR & J. P. MULLER.
TOOL FOR SECURING THE COVERS IN PAINT TINS AND THE LIKE.
APPLICATION FILED MAR. 18, 1907.

909,254.

Patented Jan. 12, 1909.

2 SHEETS—SHEET 2.

WITNESSES
James Wildbore.
Isaac Bascombe.

INVENTORS
G. W. Taylor.
J. P. Muller,
by B. J. Wildbore.
Atty

UNITED STATES PATENT OFFICE.

GEORGE WILLIAM TAYLOR, OF LEYTON, AND JOHN PETER MULLER, OF STRATFORD, ENGLAND, ASSIGNORS TO ALBERT CLARENCE HILL, OF LONDON, ENGLAND.

TOOL FOR SECURING THE COVERS IN PAINT-TINS AND THE LIKE.

No. 909,254.    Specification of Letters Patent.    Patented Jan. 12, 1909.

Application filed March 18, 1907. Serial No. 363,014.

*To all whom it may concern:*

Be it known that we, GEORGE WILLIAM TAYLOR, a subject of the King of Great Britain, residing at 12 Francis road, Leyton, in the county of Essex, England, and JOHN PETER MULLER, a subject of the King of Great Britain, residing at 8 Carpenters road, Stratford, in the county of Essex, England, have invented a new and useful Tool for Securing the Covers in Paint-Tins and the Like, of which the following is a specification.

The object of this invention is to enable the covers of paint tins and the like receptacles to be secured therein by expanding the same into a groove in the bodies of such receptacles by means of a suitable tool.

Our invention is illustrated by the accompanying drawings in which:—

Figure 1:
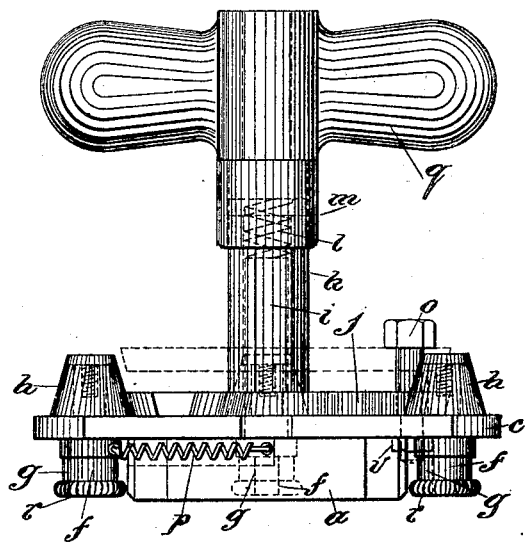
Figure 2:
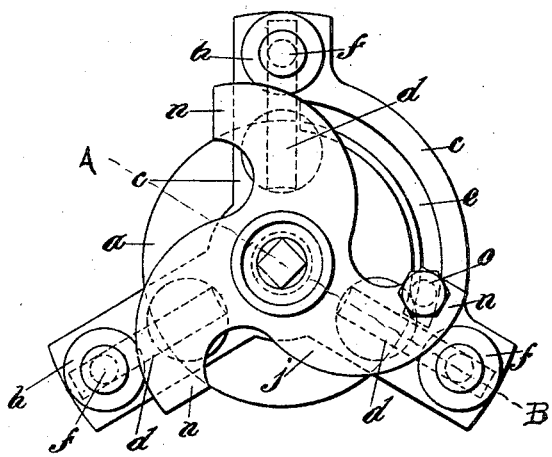
Figures 3, 5:
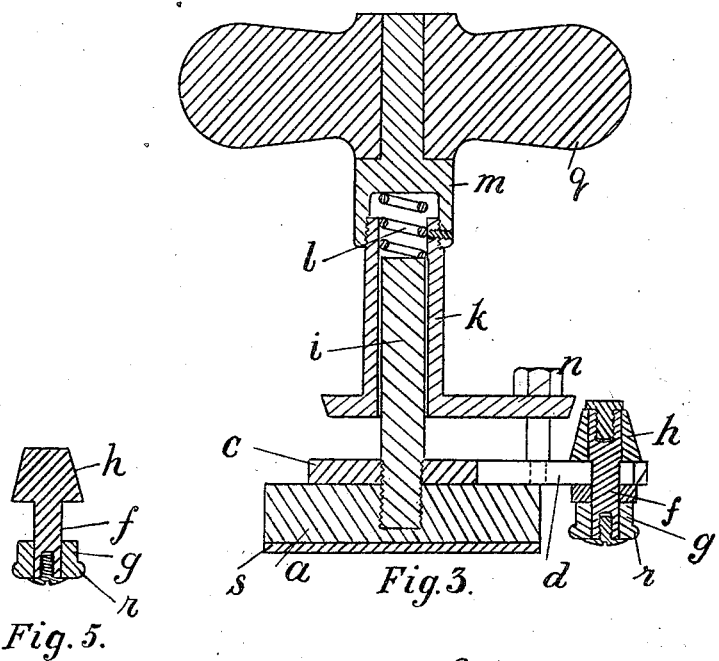
Figure 4:
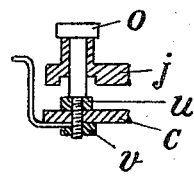

Figure 1 represents an elevation of a tool or expander constructed according to this invention. Fig. 2 represents a plan of the same. Fig. 3 is section of tool on line A B, Fig. 2. Figs. 4 and 5 are details hereinafter referred to.

The same letters denote the same parts throughout.

$a$ is a circular piece of wood or metal to which is secured a metal plate $c$ having four slots therein, three of the slots, $d\ d\ d$ being radial and the fourth slot $e$ being concentric with the piece $a$.

In each radial slot slides a spindle $f$ on which rotates a roller $g$ below the plate $c$, the said roller being furnished with a bead $r$ to expand the cover into the neck of the tin, or drum, or into a groove in the neck of the tin or drum or the like. The spindle $f$ also carries a conical roller $h$ above the said plate which engages with a cam by which the expanding rollers are forced outwards to suit the diameter of the covers to be expanded or the rollers $h$ may be dispensed with and cones or pieces of metal formed integral with the spindles $f$ used instead thereof, the said cones or pieces of metal being shaped to fit the cams $n$, see Fig. 5. $i$ is a spindle formed integral with or secured to the plate $c$.

$j$ is a cam plate having a hollow boss $k$ thereon which rotates on the spindle $i$, and a spring $l$ interposed between the top of the spindle $i$ and the cap $m$ normally maintains the cam plate in the position shown by the dotted lines. The cam plate $j$ has three cams $n\ n\ n$ thereon the edges of the cams being beveled where they come in contact with the conical rollers $h$.

$o$ is a bolt passing through the cam plate $j$ and capable of free rotation therein, the said bolt moving in the slot $e$. The bolt $o$ is shouldered as shown and passes through a washer $a$ above the plate $c$ the nut $v$ being below the said plate see Fig. 6. By turning the bolt $o$ in one direction the plates $c$ and $j$ are clamped together so as to be incapable of rotating relatively to each other although they may be made to approach each other as hereinafter described. The rollers $g\ h$ are normally drawn inwards by springs, one of which is shown at $p$.

$q$ is a handle by which the tool is rotated; or instead of the said handle a wrench may be used.

The action of the apparatus is as follows:—Supposing a number of covers of the same size have to be expanded. The plate $a$ is inserted in one of the covers and the plate $c$ prevented from rotating with one hand while the handle $q$ is rotated with the other hand so as to force the rollers $g\ h$ outwards by means of the cams until the rollers $g.\ g.\ g.$ bear on the inside of the cover; the plates $c$ and $j$ are then clamped together by means of the bolt $o$ and the expander is ready for use. When the covers have been placed in the tops of the tins which are filled with paint the expander is placed in each cover and rotated by means of the handle $q$ which handle is pressed towards the cover, at the same time the beveled edges of the cams acting on the conical rollers $h$ force the said rollers and the rollers $g$ outwards sufficiently to enable the cover to be rolled or expanded into a groove in the body of the tin or the like by means of the portion $r$ of the rollers $g$. In order to insure the portion $r$ of the rollers $g$ coming opposite the groove in the body of the tin or the like, no matter what the depth of the cover may be, we secure a packing disk $s$ to the bottom of the plate $a$, the thickness of the disk varying according to the depth of the cover and being such that the tool enters the cover to the proper distance.

We claim:—

In a tool for securing the covers in paint tins and the like the combination of a circular plate having a spindle secured therein, a slotted plate secured thereto, rollers for expanding the cover and the like on one side of the slotted plate and conical rollers on the other side of the slotted plate each roller spindle carrying an expander roller and a conical roller, a cam plate engaging with the conical rollers, means for locking the rollers at the required distance apart, means for rotating the cam plate and tool, and springs to normally maintain the cam plate at or near the apex of the conical rollers and to draw the conical rollers towards the center of the cam plate as specified.

In testimony whereof we have signed our names to this specification in the presence of two subscribing witnesses.

GEORGE WILLIAM TAYLOR.
JOHN PETER MULLER.

Witnesses:
B. J. WILDBORE,
I. BASCOMBE.